(12) United States Patent
Matter et al.

(10) Patent No.: US 7,698,958 B2
(45) Date of Patent: *Apr. 20, 2010

(54) DIFFERENTIAL PRESSURE MEANS FOR A GAS METER ARRANGEMENT, COMPRISING AN IMPROVED FLOW GEOMETRY

(75) Inventors: Daniel Matter, Brugg (CH); Thomas Kleiner, Fislisbach (CH); Beat Kramer, Windisch (CH)

(73) Assignee: Hydrometer GmbH, Ansbach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/333,543

(22) Filed: Dec. 12, 2008

(65) Prior Publication Data

US 2009/0090195 A1 Apr. 9, 2009

Related U.S. Application Data

(63) Continuation of application No. 10/553,311, filed as application No. PCT/CH2004/000222 on Apr. 13, 2004, now Pat. No. 7,464,611.

(30) Foreign Application Priority Data

Apr. 15, 2003 (DE) ................................ 103 17 166

(51) Int. Cl.
    *G01F 1/37* (2006.01)
(52) U.S. Cl. .................................................. 73/861.52
(58) Field of Classification Search .............. 73/861.52; 137/487.5
    See application file for complete search history.

(56) References Cited

U.S. PATENT DOCUMENTS

| | | | | |
|---|---|---|---|---|
| 2,929,248 A | * | 3/1960 | Sprenkle | 73/198 |
| 3,250,469 A | * | 5/1966 | Colston | 235/200 PF |
| 3,314,294 A | * | 4/1967 | Colston | 137/804 |
| 3,838,598 A | * | 10/1974 | Tompkins | 73/861.52 |
| 3,840,051 A | * | 10/1974 | Akashi et al. | 138/37 |
| 4,961,344 A | * | 10/1990 | Rodder | 73/202 |
| 5,207,089 A | * | 5/1993 | Abt et al. | 73/37 |
| 5,341,848 A | * | 8/1994 | Laws | 138/44 |
| 5,576,498 A | * | 11/1996 | Shambayati | 73/861.52 |
| 5,750,892 A | * | 5/1998 | Huang et al. | 73/202 |
| 5,869,758 A | * | 2/1999 | Huiberts | 73/197 |
| 5,918,279 A | * | 6/1999 | Hecht et al. | 73/204.21 |
| 6,073,483 A | * | 6/2000 | Nitecki et al. | 73/54.05 |

(Continued)

*Primary Examiner*—Harshad Patel
(74) *Attorney, Agent, or Firm*—Marshall & Melhorn, LLC

(57) ABSTRACT

A differential pressure system and a gas meter arrangement for precisely measuring a gas consumption by a gas meter is provided. A previously known gas meter is disposed in a bypass comprising a differential pressure system in the gas pipe for measuring a volumetric flow rate inside the gas pipe. The differential pressure system includes flow ducts having decreasing diameters as the radial position increases starting from a central axis of the differential pressure system. Examples of execution include inlet ports and/or outlet ports of the flow ducts which are provided with a specific countersink angle ($\alpha$), and an equidistant, concentric arrangement of flow ducts on the cross-sectional area of the differential pressure system. This has the advantage of increasing the differential pressure at a low volume flow rate, reducing the differential pressure at a high volume flow rate, and generally creating an improved linearity across the entire measurement range between the volume flow rate in the bypass and the volume flow rate in the gas pipe, among other advantages.

23 Claims, 2 Drawing Sheets

U.S. PATENT DOCUMENTS 6,145,544 A * 11/2000 Dutertre et al. ............... 138/39
6,186,179 B1 * 2/2001 Hill ............................ 138/39
6,601,460 B1 * 8/2003 Materna .................. 73/861.52
6,655,207 B1 * 12/2003 Speldrich et al. ........... 73/202.5
6,963,809 B2 * 11/2005 Matter et al. .................. 702/45
7,464,611 B2 * 12/2008 Matter et al. ............. 73/861.52

* cited by examiner

DIFFERENTIAL PRESSURE MEANS FOR A GAS METER ARRANGEMENT, COMPRISING AN IMPROVED FLOW GEOMETRY

RELATED APPLICATIONS

The present application is a continuation of application Ser. No. 10/553,311, filed Nov. 15, 2006, now U.S. Pat. No. 7,464,611 which is the National Phase entry into the United States of Patent Cooperation Treaty Application Serial No. PCT/CH2004/000222, filed Apr. 13, 2004. Each of the above applications is hereby incorporated by reference as if set forth entirely herein.

BACKGROUND OF THE INVENTION

The present invention relates to the field of measuring gas consumption by means of flow sensors and especially thermal flow sensors. It starts from a differential pressure means and from a gas meter arrangement for measuring a gas consumption in accordance with the preamble of the independent claims.

In WO 01/96819 A1 is disclosed a gas meter which is calibrated as an energy measuring apparatus. The calibration is based on sensor signal values being determined in dependence on the flow rate of a calibration gas and being stored in the form of a sensor calibration curve in the gas meter. The sensor calibration curve or respectively the sensor signal values are multiplied by a signal conversion factor and a calorific value factor for the base gas mixture, such that the product obtained gives a gas consumption in an energy unit. By means of a further correction factor, at least approximately the actual calorific value of a consumed gas mixture can be taken into account in the energy calibration. As the actual calorific value, a calorific value which is measured and averaged over a specific period of time can be used.

In the U.S. Pat. No. 5,750,892 is disclosed an arrangement for flow measurement which has a flow sensor in a bypass, in which arrangement an elongated laminar flow element is provided in the main stream and has a large number of flow ducts, and the connections to the bypass lie inside the linear span of the flow element. Thus the drop in pressure can be kept largely linear via the flow element or the bypass as a function of the volume flow rate, since non-linear components as a result of turbulent flow components in the inlet and outflow region of the bypass and as a result of a non-constant flow cross-section are minimised.

SUMMARY OF THE INVENTION

The object of the present invention is to quote a differential pressure means for a gas meter arrangement, and a gas meter arrangement having a differential pressure means, the differential pressure means and gas meter arrangement being distinguished by an improved measurement range. This object is accomplished according to the invention by the features of the independent claims.

In a first aspect, the invention consists in a differential pressure means for a gas meter arrangement which comprises a gas meter in a bypass to a gas pipe for measuring a gas consumption through the gas pipe, the differential pressure means being designed to be mounted in the gas pipe and having a plurality of flow ducts which have a typical diameter, flow ducts being provided in various radial positions on the differential pressure means, those flow ducts which are arranged on the pressure means closer to a radial position which is close to the centre having a larger diameter and those flow ducts which are arranged on the differential pressure means closer to a radial position which is close to the perimeter having a smaller diameter. Due to reduced diameters at the perimeter of the differential pressure means, for bypasses which branch away in this area from the gas pipe, an advantageous increase in pressure and thus an increase in the measuring effect in the bypass for low flow rates in the gas pipe is achieved. Such a differential pressure means guarantees improved measuring sensitivity for small volume flows and an increased measurement range and is therefore particularly suitable for laminar flow arrangements.

In one embodiment, the flow ducts have diameters which decrease monotonically as the radial position increases, starting from a central axis of the differential pressure means. Thus a particularly advantageous linearisation and expansion of the laminar measurement range is achieved.

In another embodiment, the inlet ports and/or outlet ports of the flow ducts have countersink angles, especially in the range 30°-90°, preferably 45°-75°, by particular preference 55°-65°. This causes a reduced differential pressure at high flow rates, such that the proportion of turbulent flow is lowered at high flow rates.

Through the embodiments according to claim 4 and 5, the laminar flow area in the main pipe and thus the linearity between the volume flow in the main pipe and the bypass and the linear measurement range are further improved.

In a further aspect, the invention consists in a gas meter arrangement for measuring a gas consumption, especially in the private, public or industrial domain, comprising a gas meter, which is arranged in a bypass to a gas pipe, and a differential pressure means which is arranged in the gas pipe and has a plurality of flow ducts which have a typical diameter, flow ducts being provided in various radial positions on the differential pressure means, and those flow ducts, the radial position of which lies closer to an inlet port of the bypass having a smaller diameter and those flow ducts, the radial position of which is further away from an inlet port of the bypass, having a larger diameter. Due to this gas meter arrangement, the above-mentioned advantages are achieved even when the branches of the bypass, i.e. the inlet and outlet ducts, are arranged at random in the cross-section of the main gas pipe.

Further embodiments, advantages and applications of the invention arise from dependent claims as well as from the following description and the figures.

BRIEF DESCRIPTION OF THE DRAWINGS

The figures show.

In the figures, identical parts are provided with identical reference numerals.

DETAILED DESCRIPTION OF THE INVENTION

Figure 1:
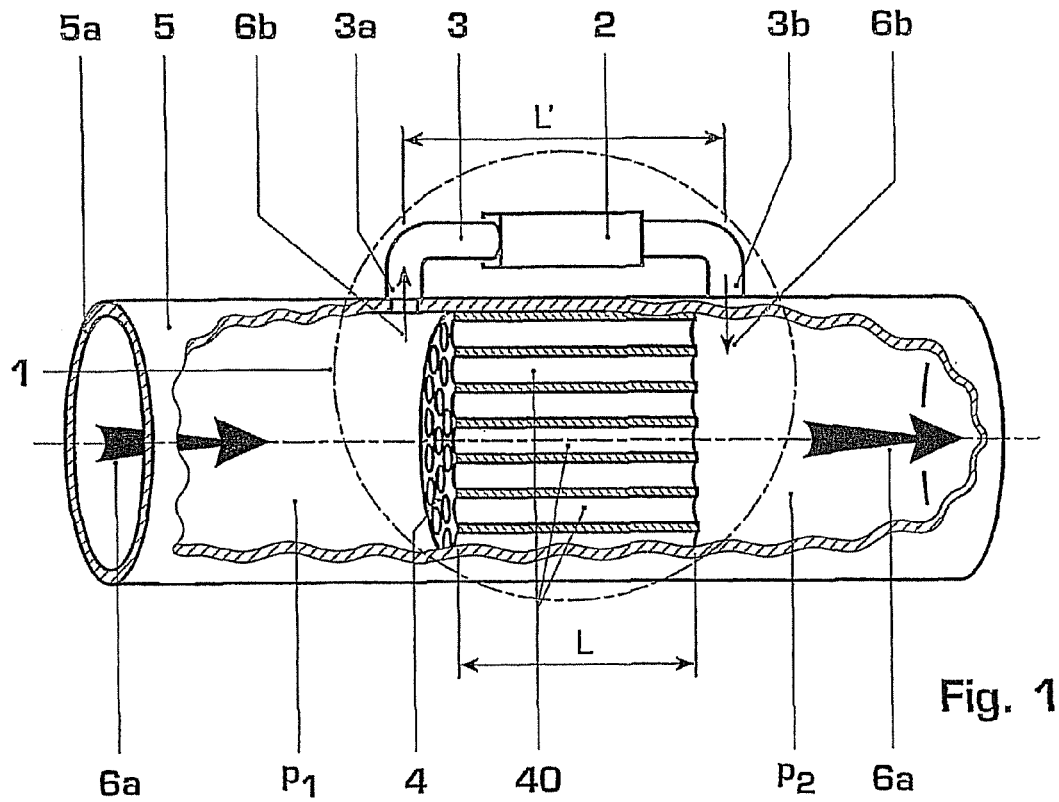
FIG. 1 a schematic representation of the geometry of the gas meter, in cross-section.

FIG. 1 shows a gas meter arrangement 1 comprising a gas meter 2, which is arranged in a measuring channel or bypass 3, and a differential pressure means 4 which is arranged in the main pipe 5. Typically, the gas meter 2 has a thermal flow sensor (not shown) for determining a volume, volume under standard conditions or energy value of the gas flowing through. The bypass 3 is here arranged by way of example and advantageously on a side wall 5a of the gas pipe 5 and has in the region of the branches an inlet port 3a and an outlet port 3b on the side wall 5a. The bypass 3 here extends substantially parallel to the gas pipe 5. Other arrangements, branches and forms of the bypass 3 which are not shown here are also possible. In the gas pipe 5 flows a main gas stream 6a, from which a small bypass gas stream 6b branches off. The branching ratio, i.e. the ratio of the volume flow rates 6b to 6a is largely predetermined by the differential pressure means 4.

Figure 2:
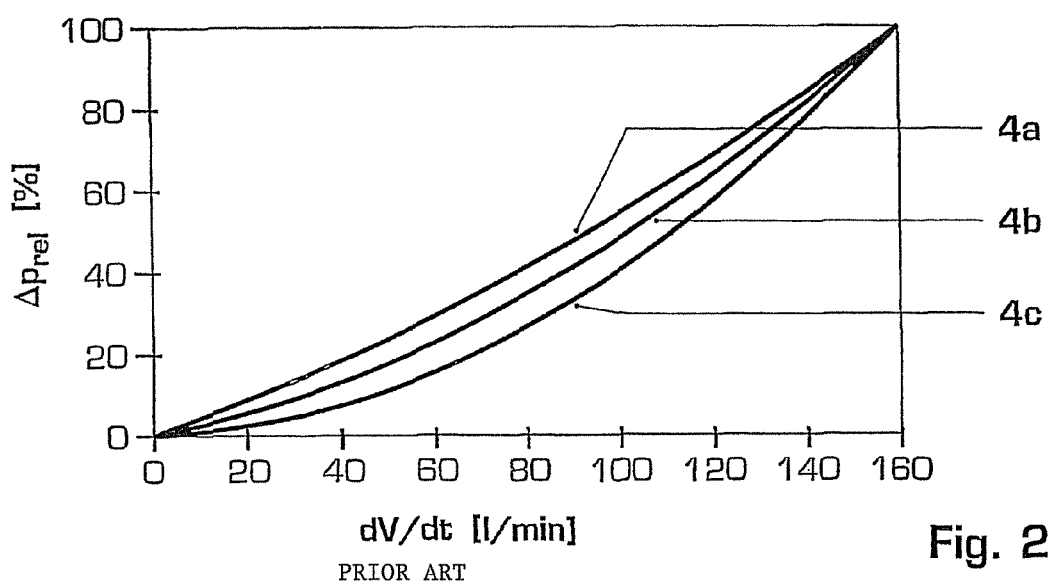
FIG. 2 a comparison of relative pressure patterns for different known differential pressure elements.

FIG. 2 shows a comparison of the relative pressure drop $\Delta P_{rel}$ as a function of the volume flow or volume flow rate dV/dt for various differential pressure means 4 which are known per se, namely for a thin-walled honeycomb structure 4a, a tube bundle 4b or a venturi meter 4c. The honeycomb structure 4a exhibits a very linear pressure rise as a function of the main volume flow 6a. What is disadvantageous is that the maximum differential pressures attainable are too small to generate sufficient flow 6b in the bypass 3. The venturi meter 4c exhibits in general too small an area with laminar flow behaviour and thus a linear pressure rise and a linear branching ratio of the volume flow rates 6b to 6a. The tube-bundle differential pressure means 4b has a plurality of flow ducts 40, which are typically round and arranged extending along the main pipe 5 and parallel to one another. Conventional tube-bundle differential pressure means 4b also suffer from the mentioned disadvantages. The linearity is admittedly, as is clear from FIG. 2, better than in the case of a venturi meter 4c, but the pressure drop $\Delta p_{rel}$ is too low for small volume flows 6a.

Figures 3A, 3B:
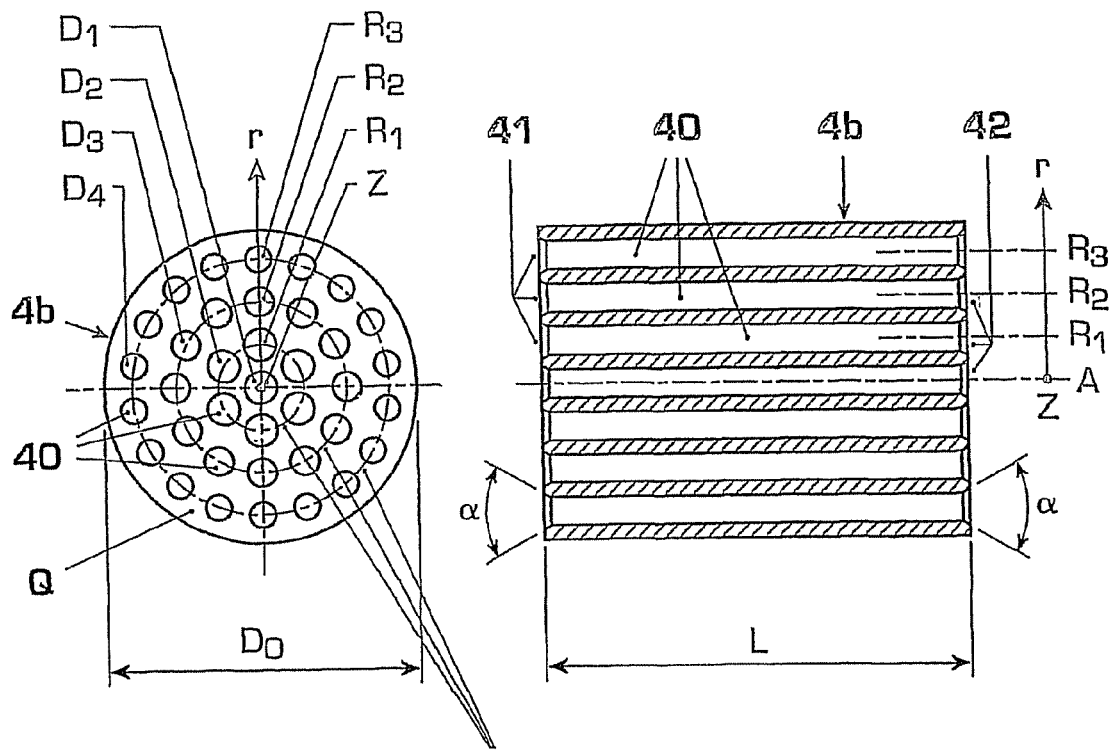
FIGS. 3a, 3b a tube-bundle differential pressure element according to the invention, in elevation and in cross-section.

FIGS. 3a, 3b show an embodiment of a tube-bundle differential pressure means 4b according to the invention. The flow ducts 40 are provided on the differential pressure means 4 in various radial positions $R_1$, $R_2$, $R_3$ or in general $R_1$, ..., $R_n$, where n=an integer index, and have a typical diameter $D_1$ ..., $D_4$ or in general $D_1$, ..., $D_m$, where m=an integer index, especially with a round cross-section, the diameter $D_1$, ..., $D_4$ or in general $D_1$, ..., $D_m$. Advantageously m is between 2 and 6 or 3 and 5 or m=4. According to the invention, those flow ducts 40 which are arranged on the differential pressure means 4 closer to a radial position $R_1$ which is close to the centre, have a larger diameter $D_1$, $D_2$ and those flow ducts 40 which are arranged on the differential pressure means 4 closer to a radial position $R_3$ which is close to the perimeter, have a smaller diameter $D_3$, $D_4$. Advantageously the diameters $D_1 > D_2 > D_3 > D_4$ or in general $D_1 > ... > D_m$ of the flow ducts 40, starting from the central axis A of the differential pressure means 4 or respectively the gas pipe 5, decrease continuously as the radial coordinate $R_1 < R_2 < R_3$ or in general $R_1 < ... < R_n$ increases. Generally, if the branches 3a, 3b of the bypass, i.e. the inlet and outlet ports 3a, 3b are positioned at random radial positions R in the main pipe 5, according to the invention those flow ducts 40, the radial position $R_1$ ... $R_n$ of which lies closer to the inlet port 3a of the bypass 3, should have a smaller diameter $D_1$, ..., $D_m$ and those flow ducts 40, the radial position $R_1$, ..., $R_n$ of which lies further from an inlet port 3a of the bypass 3, should have a larger diameter $D_1$ ..., $D_m$.

Figure 4:
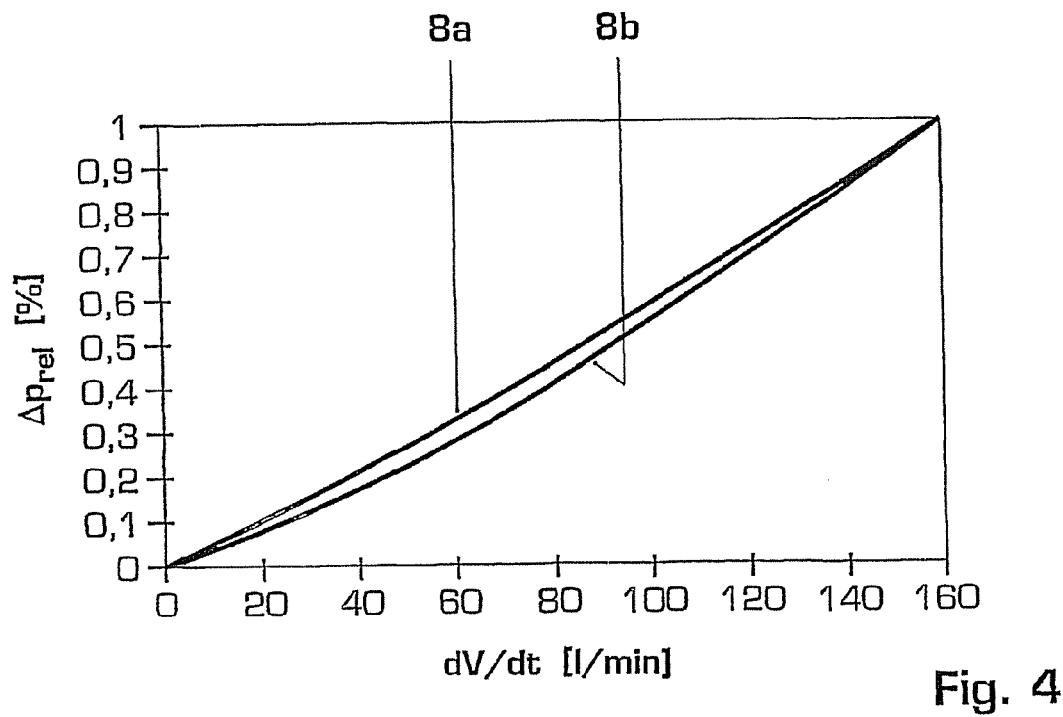
FIG. 4 measurement curves of relative differential pressure values for a tube-bundle differential pressure element according to the invention and a conventional tube-bundle differential pressure element.

FIG. 4 shows a comparison of relative differential pressure patterns for a conventional tube-bundle differential pressure means where $D_1=D_2=D_3=D_4$ (8b) and a tube-bundle differential pressure means according to the invention where $D_1 \geq D_2 > D_3 \geq D_4$ (8a). It can be recognised that by the variation of the hole diameter $D_1$ ..., $D_4$, according to the invention, namely the enlargement of the inflow ports $D_1$, $D_2$ close to the centre and/or the reduction of the inflow ports $D_3$, $D_4$, which are on the perimeter and distant from the centre, the relative differential pressure $\Delta p_{rel}$ for small volume flow rates 6a is increased and thus the entire measurement range is largely linearised. The reason for this advantageous effect according to the invention lies in the fact that in the case of the present laminar flow 6a the hole diameters $D_3$, $D_4$ of the holes lying close to the bypass 3 have a stronger influence on the total pressure drop $\Delta p$ than those hole diameters $D_1$ $D_2$ close to the centre Z of the differential pressure means 4 or of the gas pipe 5. In experiments, a maximum attainable total pressure drop $\Delta p = p_1 - p_2$ of the differential pressure means 4 of 2 mbar was achieved. Altogether a large area of laminar flow and extensive linearity of the branching ratio of the volume flow rates 6b to 6a was produced without limitation of the upper measuring limit.

Advantageously, the inlet ports 41 and/or outlet ports 42 of the flow ducts 40 according to FIG. 3 have countersink angles $\alpha$ of between 30°-90°, preferably 45°-75°, by particular preference 55°-65°. This causes a reduced differential pressure for high flow rates dV/dt and thus supports a linearisation of the measurement range for a large volume flow 6a. The countersink namely causes the partially turbulent flow conditions occurring at high flow rates dV/dt (transitional area) to be suppressed. Since the differential pressure $\Delta p$ rises via the differential pressure means 4 for the turbulent component of the flow proportionally to the square of the flow velocity or of the volume flow rate dV/dt or 6a, a reduced differential pressure $\Delta p$ or $\Delta p_{rel}$ results at high volume flow rates 6a. With the countersunk holes 41 and/or 42 what is also achieved is that the turbulent flow component with a high Reynolds number is reduced at high flow rates.

Advantageously, to further improve the laminarity of the volume flow 6a, a ratio of the total length L to the total diameter $D_0$ of the differential pressure means 4 is selected to be greater than 1, preferably 1.3 and by particular preference 1.5. Thus the formation of laminar pipe friction in each flow duct 40 is improved and the relative proportion of turbulent flow is forced back. The larger the factor total length to total diameter $L/D_0$ is, the more linear is the correlation between the volume flow rate 6a through the gas pipe 6a and the differential pressure $\Delta p = p_1 - p_2$ generated by the differential pressure means 4, which pressure is in turn proportional to the volume flow rate 6b through the bypass 3 and the gas meter 2 or its thermal flow sensor. Preferably, the flow ducts 40 have a round cross-section and the typical diameter is $D_1$, ..., $D_m$ given by the diameter $D_1$, ..., $D_m$ of inlet ports 41 of the flow ducts 40. Preferably also, the flow ducts 40 have a constant flow cross-section over the entire length L of the differential pressure means 4.

In the embodiment according to FIG. 3a and FIG. 3b, the flow ducts 40 are arranged equidistant on concentric circles 7 on the cross-sectional area Q of the differential pressure means 4. The cross-sectional area Q of the differential pressure means 4 can have an aperture ratio in the range 0.3 ... 0.8, preferably 0.3 ... 0.6, especially 0.4 ... 0.5.

In a further aspect, the invention relates to a gas meter arrangement 1 for measuring a gas consumption, especially for households, comprising a gas meter 2 in the bypass 3 and the above-mentioned differential pressure means 4 in the gas pipe 5. Here a linear span L' of the bypass 3 should be selected greater than or equal to a total length L of the differential pressure means 4, and the differential pressure means 4 should be arranged in the gas pipe 5 between the inlet port 3a and the outlet port 3b of the bypass 3. A central arrangement of the differential pressure means 4 between the bypass openings 3a, 3b is propitious. In this way it is ensured that exactly the differential pressure $\Delta p = p_1 - p_2$ defined by the differential pressure means 4 prevails over the bypass 3. Due to the design according to the invention of the differential pressure means 4, namely reduced diameters $D_1, \ldots, D_m$ of the flow ducts 40 in the vicinity of inlet and outlet ports 41 of the bypass 3, the flow profile is so modified via the cross-section Q of the differential pressure means 4 or of the gas pipe 5, that at small volume flow rates 6a a super-proportionally enlarged differential pressure $\Delta p$ prevails over the bypass 3 and drives the bypass volume flow 6b.

In a preferred embodiment, the gas meter 2 has a thermal flow sensor, especially a CMOS anemometer, with a heating wire and at least one temperature sensor arranged upstream and/or downstream. In particular, the gas meter 2 can have means for calibrating the gas consumption in units of volume under standard conditions, e.g. litre/minute (1/min), and/or energy units, e.g. kilowatt/hours (kW/h). This is described in detail in WO 01/96819, which is hereby incorporated into this description by reference with its entire disclosed contents.

LIST OF REFERENCE NUMERALS

1 Gas meter arrangement
2 Gas meter with thermal flow sensor, CMOS sensor chip gas meter
3 Bypass
3a Bypass inlet port
3b Bypass outlet port
4 Differential pressure means
40 Flow ducts, small pipes
41 Inlet ports
42 Outlet ports
4a Honeycomb structure
4b Tube bundle
4c venturi meter
5 Flow duct, pipe, main pipe
5a Side wall in the main pipe
6a Volume flow in the main pipe
6b Volume flow in the bypass
7 Concentric circles
8a, 8b Relative differential pressure curves
α Countersink angle
A Central axis
$D_0$ Total diameter
$D_1, \ldots, D_4$ Pipe diameter
L Length of the differential pressure means
L' Linear span of the bypass
$p_1, p_2$ Pressure before, after differential pressure means
$\Delta p_{rel}$ Relative differential pressure
Q Cross-sectional area
r Radius
$R_1, \ldots, R_3$ Radial positions
U Circumferential position
dV/dt Volume flow
Z Centre of the differential pressure means, central radial position

The invention claimed is:

1. Differential pressure means for a gas meter arrangement which comprises a gas meter in a bypass to a gas pipe for measuring a gas consumption through the gas pipe, the differential pressure means being designed to be mounted in the gas pipe and having a plurality of flow ducts, which have a typical diameter, flow ducts being provided in various radial positions on the differential pressure means, wherein:

a) those flow ducts which are arranged on the differential pressure means closer to a radial position which is close to the center have a larger diameter; and
b) those flow ducts which are arranged on the differential pressure means closer to a radial position which is close to the perimeter have a smaller diameter;
c) a ratio of the total length to the total diameter of the differential pressure means is selected to be greater than 1;
d) the flow ducts have a round cross-section and the typical diameter is the diameter of inlet ports of the flow ducts;
e) the flow ducts have a constant flow cross section over the entire length of the differential pressure means; and
f) inlet ports and/or outlet ports of the flow ducts have countersink angles,
wherein the flow ducts have diameters which decrease monotonically as the radial position increases, starting from a central axis of the differential pressure means.

2. Differential pressure means according to claim 1, wherein the countersink angles are in the range 30°-90°.

3. Differential pressure means according to claim 1, wherein the countersink angles are in the range 45°-75°.

4. Differential pressure means according to claim 1, wherein the countersink angles are in the range of 55°-65°.

5. Differential pressure means according to claim 1, wherein
a ratio of the total length to the total diameter of the differential pressure means is selected to be greater than 1.3.

6. Differential pressure means according to claim 1, wherein
a ratio of the total length to the total diameter of the differential pressure means is selected to be greater than 1.5.

7. Differential pressure means according to claim 1, wherein:
a) the flow ducts are arranged equidistant on concentric circles on the cross-sectional area of the differential pressure means; and
b) the cross-sectional area of the differential pressure means has an aperture ratio in a range of 0.3 to 0.8.

8. Differential pressure means according to claim 1, wherein:
a) the flow ducts are arranged equidistant on concentric circles on the cross-sectional area of the differential pressure means; and
b) the cross-sectional area of the differential pressure means has an aperture ratio in a range of 0.3 to 0.6.

9. Differential pressure means according to claim 1, wherein:
a) the flow ducts are arranged equidistant on concentric circles on the cross-sectional area of the differential pressure means; and
b) the cross-sectional area of the differential pressure means has an aperture ratio in a range of 0.4 to 0.5.

10. Gas meter arrangement for measuring a gas consumption, comprising a gas meter, which is arranged in a bypass to a gas pipe, and a differential pressure means which is arranged in the gas pipe and has a plurality of flow ducts, which have a typical diameter, flow ducts being provided in various radial positions on the differential pressure means: wherein
a) those flow ducts which are arranged on the differential pressure means closer to a radial position which is close to the center have a larger diameter; and
b) those flow ducts which are arranged on the differential pressure means closer to a radial position which is close to the perimeter have a smaller diameter; and at least one of c) an inlet port and an outlet port of the bypass are arranged on a side wall of the gas pipe; and
d) a linear span of the bypass is selected to be larger than or equal to a total length of the differential pressure means and the differential pressure means is arranged in the gas pipe between the inlet port and the outlet port of the bypass, and wherein the gas meter is a CMOS anemometer.

11. Gas meter arrangement according to claim 10, wherein the flow ducts have diameters which decrease monotonically as the radial position increases, starting from a central axis of the differential pressure means.

12. Gas meter arrangement according to claim 10, wherein the countersink angles are in the range 30°-90°.

13. Gas meter arrangement according to claim 10, wherein the flow ducts have a round cross-section and the typical diameter is the diameter of inlet ports of the flow ducts.

14. Gas meter arrangement according to claim 10, wherein
a) the flow ducts are arranged equidistant on concentric circles on the cross-sectional area of the differential pressure means; and
b) the cross-sectional area of the differential pressure means has an aperture ratio in a range of 0.3 to 0.8.

15. Gas meter arrangement according to claim 10, wherein:
a) the gas meter has a thermal flow sensor with a heating wire and at least one temperature sensor arranged upstream and/or downstream; and/or
b) the gas meter has means for calibrating the gas consumption in units of volume under standard conditions (l/mm) and/or energy units (kW/h).

16. Gas meter arrangement according to claim 10, wherein a ratio of the total length to the total diameter of the differential pressure means is selected to be greater than 1.3.

17. Gas meter arrangement according to claim 10, wherein a ratio of the total length to the total diameter of the differential pressure means is selected to be greater than 1.5.

18. Gas meter arrangement according to claim 10, wherein:
a) the flow ducts are arranged equidistant on concentric circles on the cross-sectional area of the differential pressure means; and
b) the cross-sectional area of the differential pressure means has an aperture ratio in a range of 0.3 to 0.6.

19. Gas meter arrangement according to claim 10, wherein:
a) the flow ducts are arranged equidistant on concentric circles on the cross-sectional area of the differential pressure means; and
b) the cross-sectional area of the differential pressure means has an aperture ratio in a range of 0.4 to 0.5.

20. Gas meter arrangement according to claim 10, wherein a ratio of the total length to the total diameter of the differential pressure means is selected to be greater than 1.

21. Gas meter arrangement according to claim 10, wherein the flow ducts have a constant flow cross section over the entire length of the differential pressure means.

22. Gas meter arrangement according to claim 10, wherein inlet ports and/or outlet ports of the flow ducts have countersink angles.

23. Gas meter arrangement for measuring a gas consumption, comprising a gas meter, wherein the gas-meter is a CMOS anemometer with a heating wire and at least one temperature sensor arranged upstream and/or downstream, which is arranged in a bypass to a gas pipe, and a differential pressure means which is arranged in the gas pipe and has a plurality of flow ducts, which have a typical diameter, flow ducts being provided in various radial positions on the differential pressure means wherein:
a) those flow ducts which are arranged on the differential pressure means closer to a radial position which is close to the center have a larger diameter;
b) those flow ducts which are arranged on the differential pressure means closer to a radial position which is close to the perimeter have a smaller diameter;
c) a ratio of the total length to the total diameter of the differential pressure means is selected to be greater than 1;
d) the flow ducts have a constant flow cross section over the entire length of the differential pressure means; and
e) inlet ports and/or outlet ports of the flow ducts have countersink angles.

* * * * *